(12) United States Patent
Gaur et al.

(10) Patent No.: US 12,093,966 B2
(45) Date of Patent: Sep. 17, 2024

(54) CUSTOMER SERVICE REPRESENTATIVE DASHBOARD WITH MICRO-APPLICATIONS

(71) Applicant: T-Mobile USA, Inc., Bellevue, WA (US)

(72) Inventors: Tanmaya Gaur, Kirkland, WA (US); Kevin Lau, Issaquah, WA (US); Valeri Reeves, Johns Creek, GA (US); Shashank Reddy Anugu, Bellevue, WA (US); Sreenivasulu Thimmanapalli, Cumming, GA (US); Gregory Wright, Marietta, GA (US)

(73) Assignee: T-MOBILE USA, INC., Bellevue, WA (US)

( * ) Notice: Subject to any disclaimer, the term of this patent is extended or adjusted under 35 U.S.C. 154(b) by 277 days.

(21) Appl. No.: 16/742,736

(22) Filed: Jan. 14, 2020

(65) Prior Publication Data

US 2020/0226615 A1 Jul. 16, 2020

Related U.S. Application Data

(60) Provisional application No. 62/792,308, filed on Jan. 14, 2019.

(51) Int. Cl.
*G06Q 30/016* (2023.01)
*G06F 3/0482* (2013.01)
(Continued)

(52) U.S. Cl.
CPC ......... *G06Q 30/016* (2013.01); *G06F 3/0482* (2013.01); *G06F 9/541* (2013.01); *G06Q 30/018* (2013.01)

(58) Field of Classification Search
CPC ...... G06Q 30/016; G06F 3/0482; G06F 9/541
(Continued)

(56) References Cited

U.S. PATENT DOCUMENTS

2009/0037287 A1* 2/2009 Baitalmal ............. G06F 21/128
705/27.1
2013/0159984 A1* 6/2013 Misovski .................. G06F 8/60
717/168
(Continued)

OTHER PUBLICATIONS

Dhruba Bordoloi, "Microservice based CRM Application", Oct. 22, 2018, https://www.linkedin.com/pulse/microservice-based-crm-application-dhruba-bordoloi (Year: 2018).*
(Continued)

*Primary Examiner* — Sangeeta Bahl
*Assistant Examiner* — Joshua D Schneider (57) ABSTRACT

A micro-application framework includes instantiating, on a client computer, a user interface configured with a hosting application operable to execute one or more micro-applications. During runtime of the user interface, a request for a CRM function is received. A request is sent for a micro-application that corresponds to the requested CRM function. The user interface receives from a server hosting the micro-application a data package that includes the micro-application corresponding to the requested CRM function. The executable code in the data package is executed in the hosting application via the execution environment. One or more interactive areas are rendered that are configured to display information pertaining to the requested CRM function.

20 Claims, 7 Drawing Sheets

(51) Int. Cl.
*G06F 9/54* (2006.01)
*G06Q 30/018* (2023.01)

(58) Field of Classification Search
USPC .......................................................... 705/304
See application file for complete search history.

(56) References Cited

U.S. PATENT DOCUMENTS

| | | | |
|---|---|---|---|
| 2014/0075513 A1* | 3/2014 | Trammel | H04L 63/0807 726/4 |
| 2015/0127405 A1* | 5/2015 | Peeler | G06Q 10/1095 705/7.19 |
| 2018/0075231 A1* | 3/2018 | Subramanian | H04L 63/0807 |
| 2018/0152456 A1* | 5/2018 | Chasman | G06F 21/6218 |
| 2018/0217830 A1* | 8/2018 | Bartolotta | G06F 8/61 |
| 2018/0337914 A1* | 11/2018 | Mohamad Abdul | H04L 9/3213 |
| 2019/0156198 A1* | 5/2019 | Mars | G06Q 40/02 |
| 2019/0187881 A1* | 6/2019 | Beechuk | H04L 65/403 |
| 2020/0099738 A1* | 3/2020 | Borkar | H04L 67/63 |
| 2020/0356466 A1* | 11/2020 | Thangam | G06F 40/12 |

OTHER PUBLICATIONS

Piotr Karwatka, "Token based authorization for micro-services", May 8, 2017, https://www.divante.com/blog/token-based-authorization-micro-services-open-loyalty-engineering (Year: 2017).*

* cited by examiner

CUSTOMER SERVICE REPRESENTATIVE DASHBOARD WITH MICRO-APPLICATIONS

CROSS-REFERENCE TO RELATED APPLICATIONS

This application claims priority to a co-pending, commonly owned U.S. Provisional Patent Application No. 62/792,308, filed on Jan. 14, 2019, and titled "Customer Service Representative Dashboard Application," which is herein incorporated by reference in its entirety.

BACKGROUND

Many products and services involve a complex network of relationships. For example, enterprise level software applications provide solutions for critical business operations of organizations. These operations may include customer billing, access authorization, product shipment, and service fulfillment. The use of a computer-based network can facilitate the implementation of such services. For example, a computer-based network may be implemented that can host computing resources that can be accessed by various users. The computing resources may be provided to, for example, representatives who service users of the business operations. The users may communicate, collaborate, and exchange data while providing various services and products. However, the software applications that enable these services and products can be complex and costly to provide. Multiple systems can be impacted, for example, when a product or service is updated. Additionaly, an update for a single operation, such as customer billing, access authorization etc., can have impacts across multiple products and services. Operation being as mentioned above.

As the number and types of operations, products, and services increase, the amount and complexity of the relationships between the users can increase dramatically. Additionally, the volume and types of data associated with the products and services can be significant. It may thus be increasingly costly to communicate relevant information to the various users in a timely manner.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

The present disclosure relates to computing and data processing, and in particular, to a micro-application framework. Various systems and methods are described for using micro-applications to efficiently implement a platform for providing multi-faceted services between service providers and end users. Many services require access to multiple systems and functions which may in turn have different characteristics, histories, and interfaces. These different facets may require the client or user to access and manage multiple interfaces or require the client or user to have access to complex software that attempts to manage these multiple interfaces. In the former case, the user must learn and work with multiple systems, which can require a steep learning curve, and can be a continuous drain on time and effort. In the latter case, the client software can become increasingly complex as more interfaces are added, and multiple updates may be required as the new interfaces are added.

These issues can be alleviated through the disclosed micro-application framework. In some embodiments, the framework may be associated with one or more micro-applications that each enable a defined set of functions that can independently called and executed, for example in a separate silo or domain. In some embodiments, a container micro-application may be implemented that provides the capability to toggle between micro-applications and allow micro-applications to run side by side without a browser reload. The container micro-application may load on a browser and inject and remove other micro-applications from the HTML data object model which generates what the user views. Each micro-application may generate a client interface that may include, for example, a menu or other interactive features. Alternatively, a client menu may provide a common client menu across micro-applications. In some embodiments, the common client menu can be its own micro-application. Each micro-application may be associated with different access restrictions and permissions, such as requiring different tokens. In an embodiment, the client-side browser can store and maintain states for micro-applications.

In some embodiments, micro-applications may be automatically selected and called based on user queries. The queries may be supplemented using aids such as machine learning. Multiple micro-applications may be opened and accessed by the user while maintaining a common user environment so that the user experiences all accessible micro-applications as though working with a single application.

Micro-applications may be updated independently and thus the micro-application framework itself need not be updated when an individual micro-application needs to be updated or added. Micro-applications can further communicate and share information so that data changes made by one micro-application may be provided to other micro-applications that use that data. In some embodiments, micro-applications can be developed using a platform such as Angular.

The micro-application framework may be implemented in a network hosting computing resources that are allocated to various users. The users may communicate, collaborate, and exchange data while providing various services and products. The client interface for the micro-application framework can be, for example, a user interface such as a browser that is configured to provide a navigation interface that enables the user to search or browse for micro-applications and launch the micro-applications. In some embodiments, the navigation interface can be its own micro-application. The browser may perform common functions such as verification, customer lookup, and token generation, which in some embodiments can be implemented as a micro-application.

In one example, the micro-application framework may be used to manage customer service interactions for a service provider. For example, users may include customer service representatives and the various functions that are used by the customer service representatives. In various embodiments disclosed herein, the framework may be configured to allow the users to select functions to enable collection and distribution of data associated with services. A customer service representative can be presented with multiple micro-applications within one browser session of the micro-application framework. Each micro-application may be associated with one or more microservices for providing customer service. The business logic on a micro-application may be different for each micro-application and change as the user calls a different micro-application. Multiple micro-applications can be opened while maintaining a common look and feel of the user interface so that the user experiences all accessible micro-applications as though working with a single application.

The data may include various types of data associated with products and services. The data may include digitized representations of product documentation, monitoring information, alerts, data related to customer service plans, billing details, network and hardware (device) information, and the like. In one example, the data may include system and product information such as model, life cycle, systems, groups, installation location, and equipment information; documentation such as documents, instructions, failure modes, alert types, and improvement requests; maintenance and service information such as notifications and work orders; and timeline information such as dates for significant events.

The collection, aggregation, and distribution of micro-applications and associated data may require a significant amount of resources. Computing resources are needed to collect, analyze, organize, store, and distribute the micro-applications and associated data. The disclosed embodiments may allow for various users of the micro-application framework to access and use multiple micro-applications and a complex hierarchy of associated information and enable the latest data to be accessed by other users of the micro-application framework. In some embodiments, data may be stored in backend systems and databases. Micro-applications may use an API gateway and/or a microservice system to access data from the backend systems and databases. Updated data may be written back to the backend systems and databases so that the next load for a micro-application accesses the updated data. Users may access information about micro-applications that are relevant to their history, such as products and services that are in use by a given user. may be efficiently be provided the most current information that may be beneficial for their acquired products and services. The micro-application framework may thus enable a client-centric model for accessing and updating information in a complex hierarchy of products, services, and data over a disparate network.

While some of the illustrated examples are described in terms of customer service representative micro-applications, the principles may be applied to any service for which multiple micro-applications may invoked. The micro-application framework provides the infrastructure for enabling the creation and distribution of micro-applications, including the micro-application and data generation and distribution platforms, as well as the complex infrastructure that includes storage, metadata, and/or placeholders for the micro-applications and their associated information. In some embodiments, the placeholders may be implemented as extensions of the micro-application framework. The placeholders may be populated with specific micro-applications that may be generated by developers of the micro-application framework. In some embodiments, the placeholder may be a collection of metadata that can be populated as information becomes available or as otherwise provided by the micro-application framework.

As used herein, a micro-application may comprise executable computer functionality that is available as a service and exposed programmatically via web and other protocols. A micro-application may be configured to perform one or more functions. For example, a micro-application may generate a graphical user interface (GUI) that displays information in response to a user input or provides a specific way for a user to interact with the micro-application. The micro-application may further generate a navigation bar, an authorization utility, a login interface, a data management tool, and the like. Micro-applications may include programmatic layers to APIs, network connectivity, and/or generally middle-tier or server-side computing functionality. In some embodiments, some or all login and other common functions may be implemented as a micro-application. Additionally, session information may be maintained by a common utility so that each micro-application need not request the user to re-login/validate.

A micro-application framework may be stored in part on an application server. Micro-application code may be stored in a micro-application code data store that is accessible to the application server. In some embodiments, the micro-application code may be accessible via application programming interfaces (APIs). In one embodiment, micro-application code may be hosted on separate server. In some embodiments, HTML and JS may be downloaded, APIs may be invoked, and the user view may be generated at the client. In a server-side implemented, the server may return fully formed HTML which includes client data to be displayed. In a further embodiment, micro-application code hosted on separate server and may run stand alone. The user dashboard may open the micro-application in a new window, and controls supported between the user dashboard and the micro-application may include closing pop-out windows, and rendering and enabling the two-way sharing of events and data. Micro-applications may be configured to communicate with each other. Examples may include enterprise client accounts with multiple lines of service/business. Switching between line of service may change what an open micro-application displays. A micro-application that allows a user to switch lines of service may notify other micro-applications on the same browser to effect the required change. This may be implemented using browser events.

Figure 1:
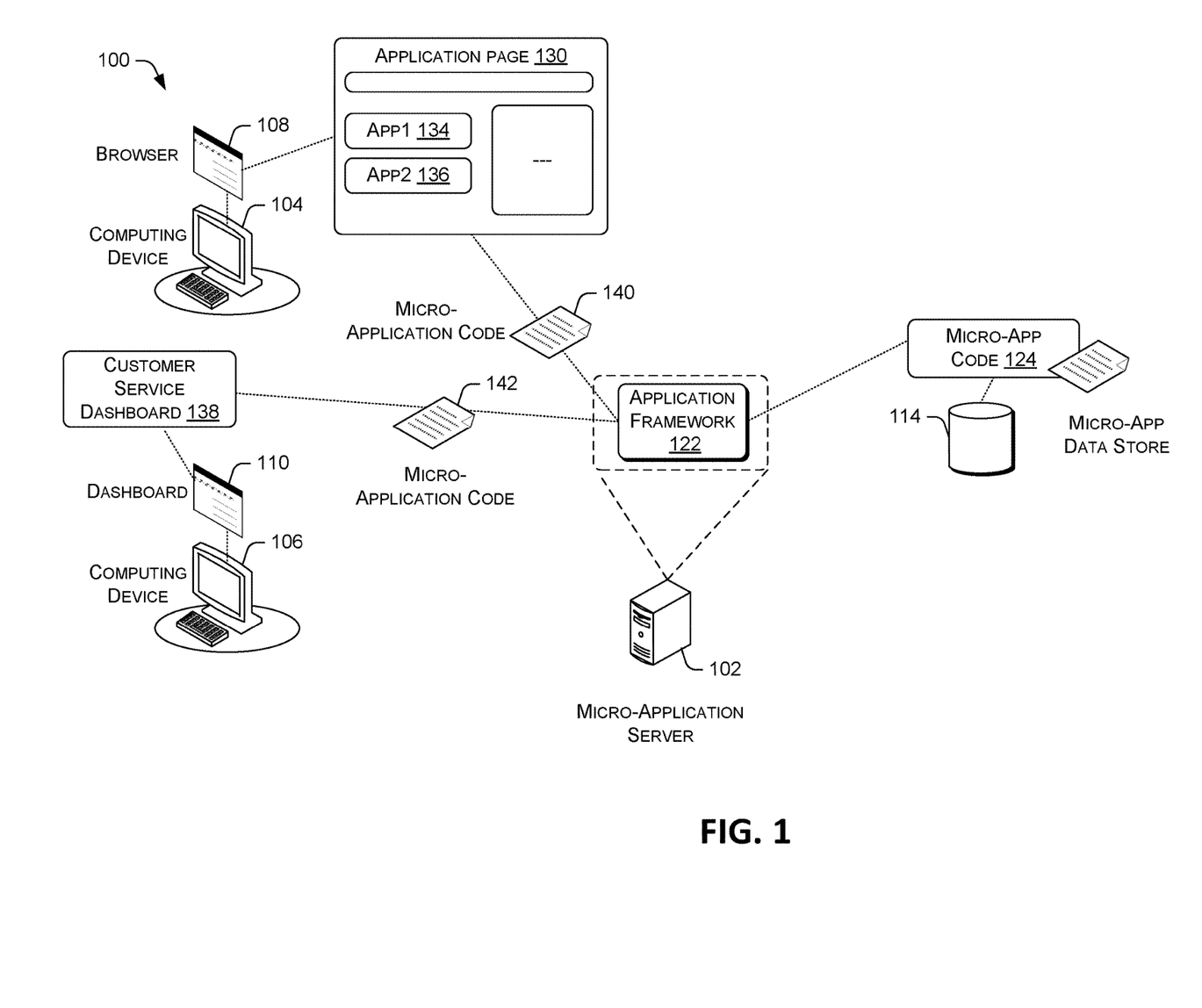
FIG. 1 illustrates an example architecture that implements a micro-application environment.

FIG. 1 illustrates an example architecture 100 that implements a micro-application framework. The architecture 100 may include a micro-application server 102, a computing device 104, and a computing device 106. The micro-application server 102 may contain both UI functions (HTML, JS, CSS) and API gateway/experience functions. For some micro-applications, the API gateway/experience functions may be hosted on a different micro-application server than where the UI functions are hosted. The micro-application server 102 may receive requests for micro-applications and delivers micro-applications to client applications on client devices, such as the computing devices 104 and 106. The computing devices 104 and 106 may be connected to the micro-application server 102 via a network. The network may include a wireless carrier network, a local area network (LAN), a larger network such as a wide area network (WAN), and/or a collection of networks, such as the Internet. In some embodiments, the client applications may be web browsers, such as the web browser 108 on the computing device 104, and the representative dashboard 110 on the computing device 106.

The micro-application server 102 may communicate with the client applications via Hypertext Transfer Protocol Secure (HTTPS) or other protocols to deliver micro-applications. The micro-application server 102 may support server-side scripting via multiple scripting languages, such as Active Server Pages (ASP), Hypertext Preprocessor (PHP), Angular, React, Vue and other server side or client side scripting frameworks. The micro-application server 102 may access multiple data stores via the network. The multiple data stores may include micro-application code data store 114.

In one example, the application page 130 as displayed by the browser 108 may include a web page link or other control objects that can be activated to request access to micro-application code 140. In turn, the micro-application server 102 may send the micro-application code 140 to the web browser 108 for execution. In another scenario, a customer service dashboard 138 as displayed by the dashboard 110 may include a link or some other control object that can be activated to request access to the micro-application 142. In another example, an icon may be rendered on the desktop and configured to launch the micro-application framework.

During runtime, the browser 108 may send a request to access a micro-application to the micro-application server 102. In response, the micro-application server 102 may locate the micro-application and send the micro-application to the browser 108. The micro-application framework may manage a list of micro-applications. The micro-application list may include a repository of all micro-applications as well as a dictionary of associated permissions and controls for access. The micro-applications may be identified by unique identifiers that are known by the micro-application framework, such as titles or network addresses (e.g., a uniform resource identifier (URL), a uniform resource locator (URL), an IP address, etc.). In some embodiments, each micro-application may have an individual micro-application application server. The request to retrieve a micro-application can be made using a micro-application DNS and routed to the appropriate server using DNS resolution/routing rules The micro-application may include feature presentation code that dictates the presentation layout for features of the micro-application. Additionally, the micro-application may include content or referenced content that is accessible at another location, for example using a network address of a server, a file directory pathway, and/or other information for locating and accessing the content.

The server 102 may provide a web server that supports server-side or client-side scripting via multiple scripting languages, ASP, PHP, JavaScript, and other scripting languages. The server 102 may access multiple data stores via the network. The multiple data stores may include a micro-application data store 114, content stores, and the like. The API and UI code can be on the same server or different server. The server may contain one micro-application or multiple micro-applications, and can be server-side or client-side In some various embodiments, the server 102 may provide network portals that enable the one or more authorized developers to upload micro-applications. The server 102 may support micro-applications developed in various programming languages. For example, an application code may be developed using Angular, HTML, ASP, JSP, ColdFusion, and/or so forth. Thus, the application code may be compiled, translated, or otherwise converted from an inputted programming source code.

Figure 2:
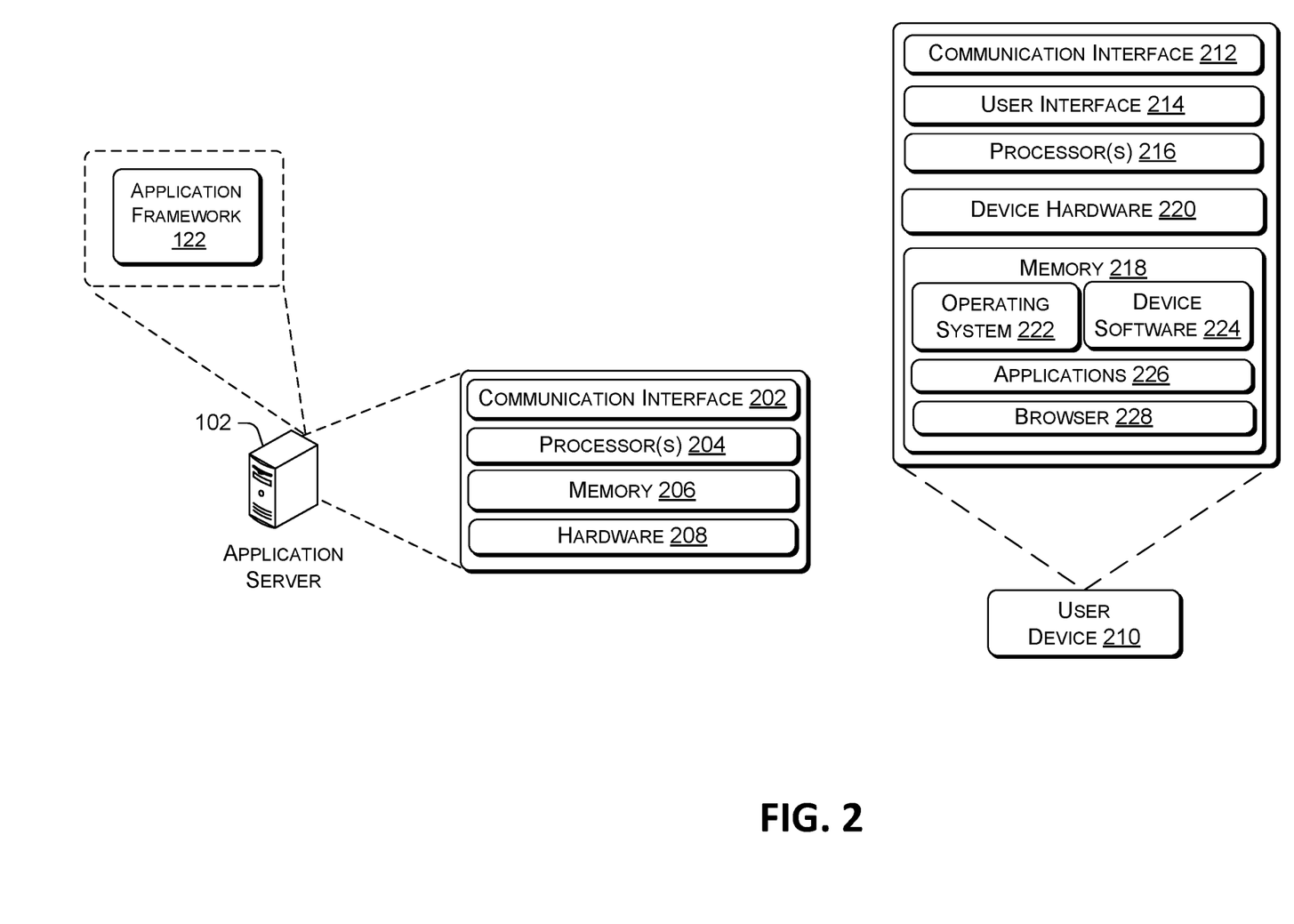
FIG. 2 is a block diagram showing various components of a server and a computing device that support a micro-application framework.

FIG. 2 is a block diagram showing various components of an application server and a computing device that support the implementation of a micro-application framework. The server 102 may be implemented using one or more computing nodes. The computing nodes may include a communication interface 202, one or more processors 204, memory 206, and hardware 208. The communication interface 202 may include wireless and/or wired communication components that enable the micro-application server 102 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the server 102 or components thereof may be implemented using virtual computing devices in the form of virtual machines or software containers that are hosted in a computing cloud. The computing cloud may include a variety of disaggregated servers that provide virtual application server functionalities and virtual storage functionalities.

As shown in FIG. 2, a user device 210 may be representative of the computing device 104 or the computing device 106. The user device 210 may include a communication interface 212, a user interface 214, one or more processors 216, memory 218, and device hardware 220. The communication interface 212 may include wireless and/or wired communication components that enable the electronic device to transmit or receive voice or data communication via the wireless carrier network, as well as other telecommunication and/or data communication networks.

The user interface 214 may enable a user to provide inputs and receive outputs from the user device 210. The user interface 214 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 218 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 220 may include a modem that enables the user device 210 to perform telecommunication and data communication with a network. The device hardware 220 may further include signal converters, antennas, hardware decoders and encoders, graphics processors, a universal integrated circuit card (UICC) or an embedded UICC (eUICC), and/or the like that enable the user device 210 to execute applications and provide telecommunication and data communication functions.

The one or more processors 216 and the memory 218 of the user device 210 may implement an operating system 222, device software 224, one or more applications 226, and a web browser 228. Such software may include routines, program instructions, objects, and/or data structures that are executed by the processors 216 to perform particular tasks or implement particular abstract data types.

The operating system 222 may include components that enable the user device 210 to receive and transmit data via various interfaces (e.g., user controls, communication interface 212, and/or memory input/output devices). The operating system 222 may also process data using the one or more processors 216 to generate outputs based on inputs that are received via the user interface 214. For example, the operating system 222 may provide an execution environment for the execution of the applications 226 and the web browser 228. The operating system 222 may include a presentation component that presents the output (e.g., display the data on an electronic display, store the data in memory, transmit the data to another electronic device, etc.).

The operating system 222 may include an interface layer that enables applications to interface with the modem and/or the communication interface 212. The interface layer may comprise public APIs, private APIs, or a combination of both public APIs and private APIs. Additionally, the operating system 222 may include other components that perform various other functions generally associated with an operating system. The device software 224 may include software components that enable the user device to perform functions. For example, the device software 224 may include basic input/output system (BIOS), bootrom, or a bootloader that boots up the user device 210 and executes the operating system 222 following power-up of the device.

The applications 226 may include applications that provide utility, entertainment, and/or productivity functionalities to a user of the user device 210. For example, the applications 226 may include telephony applications, electronic mail applications, remote desktop applications, navigation applications, office productivity applications, multimedia streaming applications, an online shopping application, and/or so forth. The web browser 228 may enable a user to access web pages provided by the micro-application server 102, such as the application web page 130 and the customer service dashboard 138.

Figure 3:
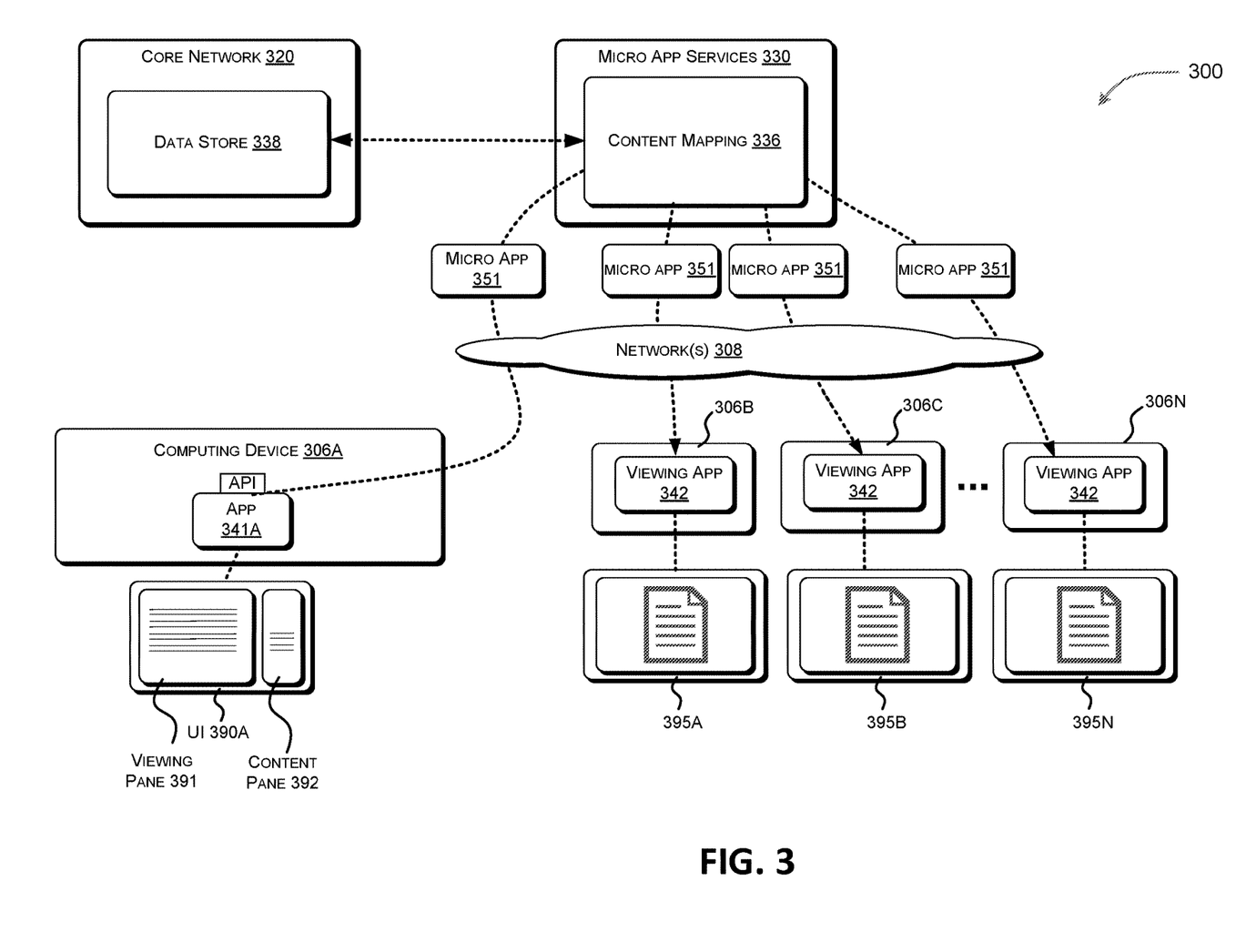
FIG. 3 is an example architecture for implementing a micro-application framework according to one embodiment.

FIG. 3 illustrates a system 300 for enabling the access and execution of micro-applications from client application 341. In this example, a user can interact with a client application 341 to access, create, or edit micro-applications, and view and add or edit data that is associated with a particular micro-application. The client application 341 may each be configured to display a viewing pane 391 and a content pane 392. The content of a micro-application may be displayed in the viewing pane 391. A user may be enabled to select types of content to accessed by the micro-application, for example, via viewing pane 391. In one embodiment, a content pane 392 may allow a user to view data for a content type for a given product or service, for example selected by the user via the viewing pane 391. The content pane 392 may be synchronized to enable a user to work within each micro-application and view current content of a micro-application that they are accessing while also viewing content specific to another micro-application.

A selected micro-application rendered in the content pane 392 can be used to generate content data having semantics, rules, metadata, and the like. In some embodiments, micro-application framework 122 can identify or generate micro-applications for use by multiple users and applications.

Micro-application 351 may be configured to access and edit text, images, media, or any other form of data. The micro-application 351 can be managed by micro app services 330 and mapped by a mapping component 336. Various data can be stored in data store 338 of core network 320. In some embodiments, rules, metadata, and/or semantics may be integrated into, or linked to, the micro-application 351.

The micro-application 351 can be communicated to any number of computing devices 306, referred to herein as computing devices 306B-306N, from a first computing device 306A or the micro-application services 330 via a network 308. Each computing device 306B-306N associated with a user can render the micro-application 351 on a user interface 395 (395A-395N) by the use of a viewing application 342. The viewing application 342 can be any suitable application such as a presentation program, a web browser, etc. The viewing application 342 may also be a web-based application.

It should be appreciated that the subject matter described herein may be implemented as a computer-controlled apparatus, a computer process, a computing system, or as an article of manufacture such as a computer-readable storage medium. The various described services and functions may be remotely implemented such as on a server or may be implemented on one or more devices. Among many other benefits, the techniques shown herein improve efficiencies with respect to a wide range of computing resources. For instance, human interaction with a device may be improved, as the use of the techniques disclosed herein enable users to share and consume data from a wide range of data types. In addition, improved human interaction improves other computing resources such as processor and network resources, e.g., users can work from a reduced number of applications and reduce a user's computer interaction, reduce the chances of an inadvertent input, reduce network traffic, and reduce computational cycles. Furthermore, instead of distributing data to users who may not use or need the data, content can be selectively distributed to subscribing users. Thus, data is distributed based on need, thus improving the efficiency of storage and network resources. Other technical effects other than those mentioned herein can also be realized from implementations of the technologies disclosed herein.

Figure 4:
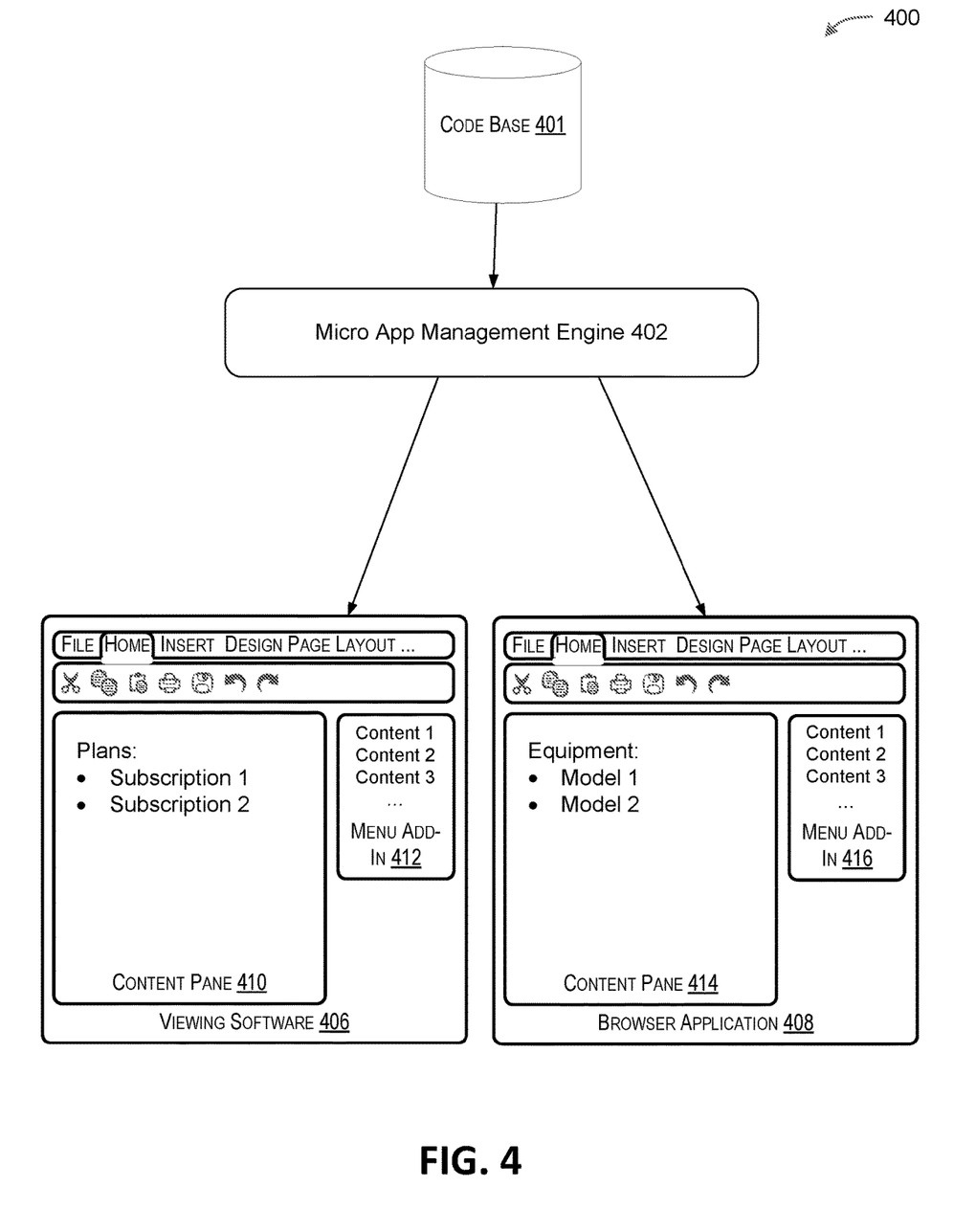
FIG. 4 is an example architecture for implementing a micro-application framework according to one embodiment.

FIG. 4 illustrates a block diagram 400 for identifying and managing content for the micro-application framework. In some embodiments, code base 401 may include a plurality of micro-applications. The micro-applications may be accessed via a network by micro app management engine 402. Micro app management engine 402 may receive and maintain micro-applications content, including metadata associated with the content, to associate micro-applications with identifiers that may be called by client applications. In some embodiments, content may be stored in micro-application code base 401, which may be implemented by a storage service.

In some embodiments, content stored in micro app code base 401 may be retrieved by software applications, such as viewing software 406 or browser application 408. Such applications may be configured to include content panes 410 and 414 where content is displayed as the micro-applications are executed. Viewing software 406 and browser application 408 may also include menu components 412 and 416. In some embodiments, the menu components may render content or list selected content that can be edited or otherwise modified by applications 406 and 408 and displayed in content panes 410 and 414.

In this example, a local computer may include a display, and the local computer may execute applications 406 and 408 that generate micro-application options. The information for rendering particular options for a micro-application may be determined based on the executed micro-application code or derived from data stored on one or more computer systems. Micro-applications on the micro app code base 404 and associated data may be stored on servers and storage devices and accessed across a communication network such as the Internet. The servers may be part of a cloud computing network, for example. In this example, micro app code base 401 may store data sets in one or more databases or similar data repository systems.

In one example embodiment, applications 406 and 408 may be implemented as application logic in a user interface application. The user interface application may be implemented as a web browser, such as, for example, Chrome, Internet Explorer, Edge, Firefox, Safari, or similar browser software. A local computer may execute the user interface software that may include a visualization application which accesses data sets associated with a micro-application. In one embodiment, users may select any one or more of micro-application options, view the micro-application using the applications 406 and 408, and save data edited or created by created micro-applications.

Figure 5:
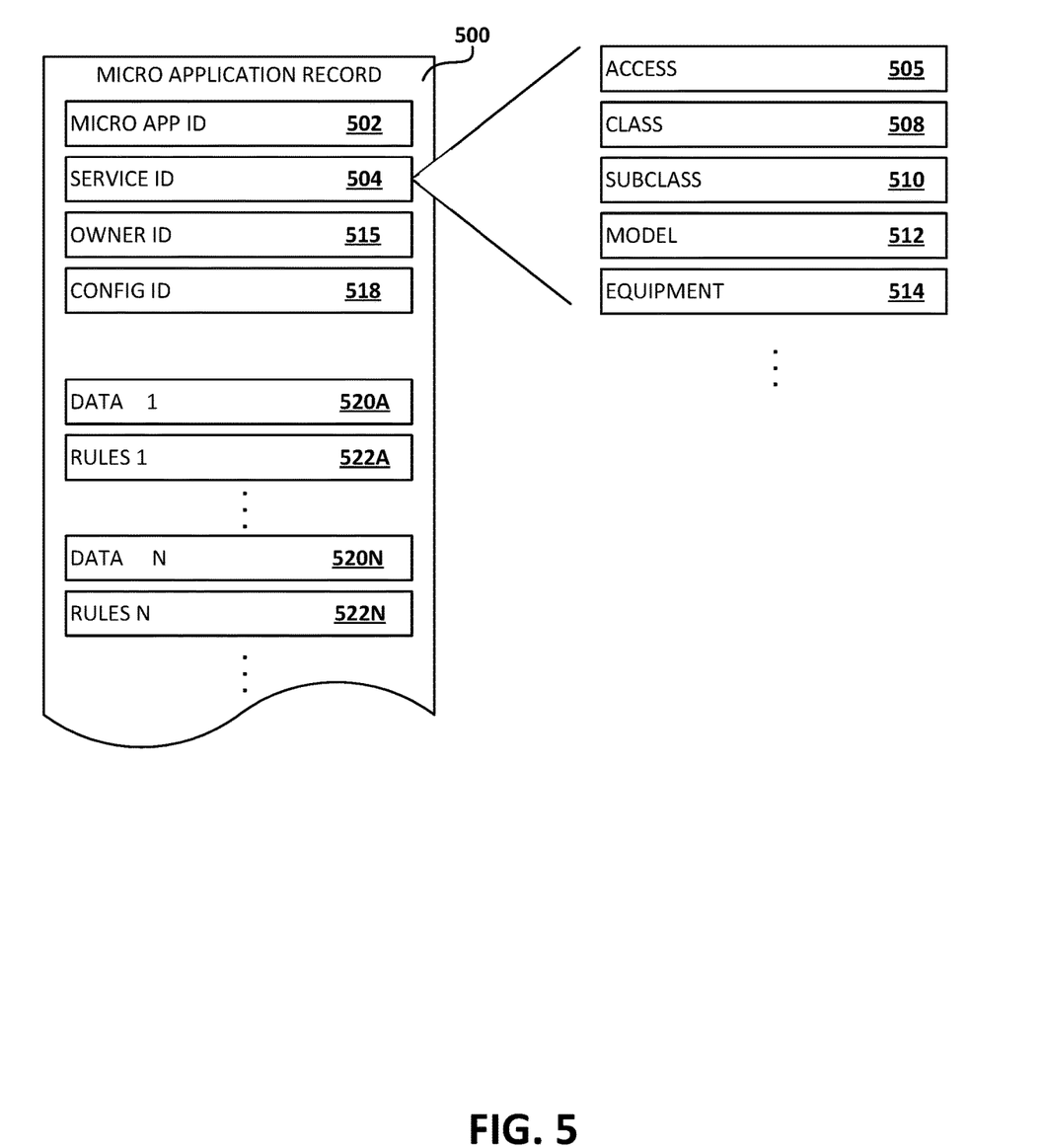
FIG. 5 illustrates a data structure for implementing a micro-application framework according to an embodiment.

FIG. 5 illustrates a data structure diagram showing a number of data elements stored in a micro-application package record 500 that includes metadata stored for a micro-application. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Each micro-application record 500 may contain a micro-application ID 502 identifying the micro-application for whom the micro-application record 500 is created. In some embodiments, the micro-application record 500 may additionally or alternatively contain various metadata describing the associated service ID 504, access ID 505, security class 508, and the like. The micro-application record 500 may also contain an owner ID 515 indicating an identification of a particular user associated with the record.

It will be appreciated that the micro-application record 500 may contain additional data elements beyond those shown in FIG. 5 and described above that are utilized by the micro-application framework and/or other systems and services.

Figure 6:
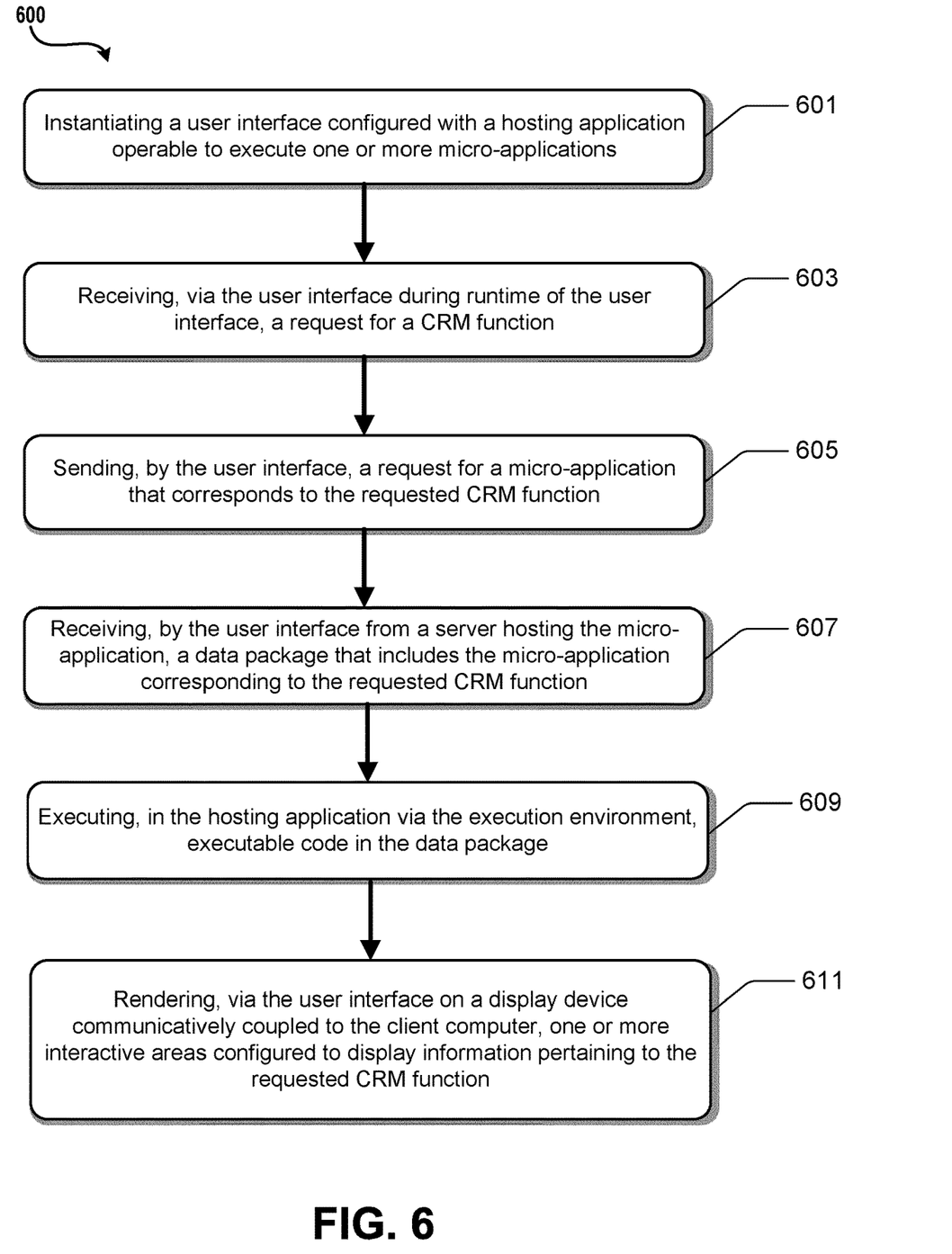
FIG. 6 illustrates a flow diagram of an example process for implementing a micro-application framework.
Figure 7:
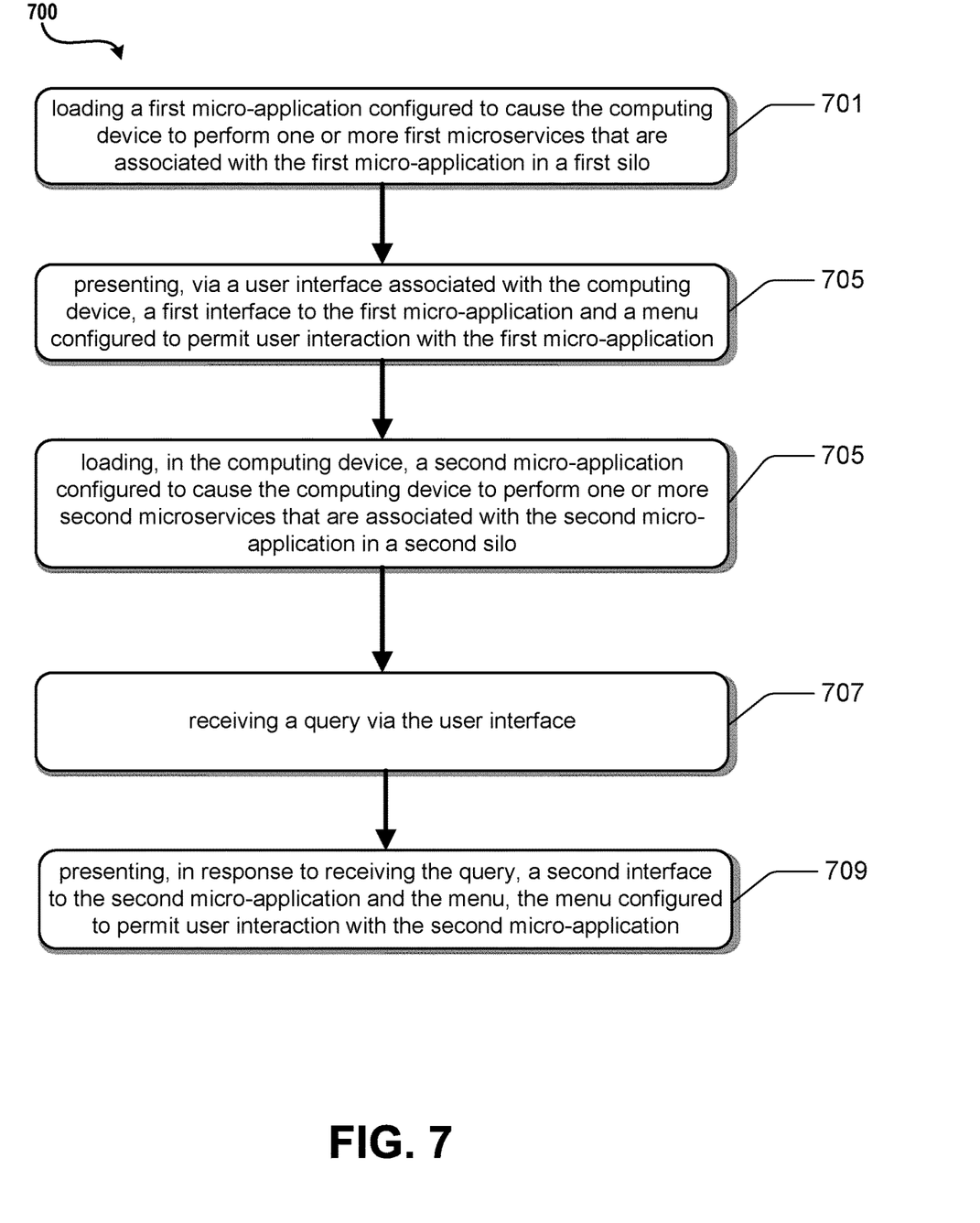
FIG. 7 is a flow diagram of an example process for implementing a micro-application framework.

FIGS. 6-7 present illustrative processes 600-700 for implementing a micro-application. Each of the processes 600-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process. For discussion purposes, the processes 600-700 are described with reference to the architecture 100 of FIG. 1.

FIG. 6 illustrates an example operational procedure for communicating information in a networked environment comprising one or more computing devices, in accordance with the present disclosure. The operational procedure may be implemented in a system comprising one or more computing devices. Referring to FIG. 6, operation 601 illustrates instantiating, on a client computer, a user interface configured with a hosting application operable to execute one or more micro-applications. In an embodiment, the hosting application implements an execution environment for at least one micro-application. Additionally, the one or more micro-applications may comprise a code package that implements a customer relationship management (CRM) function. In some embodiments, the one or more micro-applications may include an application programming interface (API) configured to receive electronic messages indicative of requests for customer data.

Operation 601 may be followed by operation 603. Operation 603 illustrates receiving, via the user interface during runtime of the user interface, a request for a CRM function.

Operation 603 may be followed by operation 605. Operation 605 illustrates sending, by the user interface, a request for a micro-application that corresponds to the requested CRM function.

Operation 605 may be followed by operation 607. Operation 607 illustrates receiving, by the user interface from a server hosting the micro-application, a data package that includes the micro-application corresponding to the requested CRM function.

Operation 607 may be followed by operation 609. Operation 609 illustrates executing, in the hosting application via the execution environment, executable code in the data package.

Operation 609 may be followed by operation 611. Operation 611 illustrates rendering, via the user interface on a display device communicatively coupled to the client computer, one or more interactive areas configured to display information pertaining to the requested CRM function.

In an embodiment, the hosting application may be configured to persist user credentials, user verification status, and tokens. In an embodiment, the data package is received substantially in real time, in response to sending the request for the requested CRM function.

In an embodiment, the hosting application is configured to execute, in parallel, a plurality of micro-applications. In an embodiment, the hosting application is configured to cut and paste data between micro-applications.

In an embodiment, the hosting application is configured to auto-populate data between micro-applications. In an embodiment, the hosting application is resolve duplicate data or conflicting data between micro-applications. For example, the hosting application may resolve data that is entered by a first user using a first micro-application, where the data is entered differently by a second using a second micro-application.

FIG. 7 illustrates an example operational procedure for communicating information in a networked environment comprising one or more computing devices, in accordance with the present disclosure. The operational procedure may be implemented in a system comprising one or more computing devices. Referring to FIG. 7, operation 701 illustrates loading a first micro-application configured to cause the computing device to perform one or more first microservices that are associated with the first micro-application in a first silo.

Operation 701 may be followed by operation 703. Operation 703 illustrates presenting, via a user interface associated with the computing device, a first interface to the first micro-application and a menu configured to permit user interaction with the first micro-application.

Operation 703 may be followed by operation 705. Operation 705 illustrates loading, in the computing device, a second micro-application configured to cause the computing device to perform one or more second microservices that are associated with the second micro-application in a second silo.

Operation 705 may be followed by operation 707. Operation 707 illustrates receiving a query via the user interface. Operation 707 may be followed by operation 709. Operation 709 illustrates presenting, in response to receiving the query, a second interface to the second micro-application and the menu, the menu configured to permit user interaction with the second micro-application.

In an embodiment, the menu may include one or more items to interact with a currently executing micro-application in response to a user selection. The one or more items may be individually inactivatable in accordance with user permissions.

In an embodiment, the first interface is not presented while the second interface is being currently presented, and the menu is operable only for the interface being currently presented.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for implementing a customer relationship management (CRM) system, the method comprising:
   instantiating, on a client computer, a user interface configured with a container micro-application operable to execute one or more other micro-applications, wherein:
   the container micro-application implements an execution environment for at least one other micro-application;
   the container micro-application is configured to inject and remove any of the one or more other micro-applications from an HTML data object model;
   the one or more other micro-applications comprise a code package that implements a CRM function; and
   the one or more other micro-applications include an application programming interface (API) configured to receive electronic messages indicative of requests for customer data;
   receiving, via the user interface during runtime of the user interface, one or more user queries;
   supplementing the one or more user queries using machine learning;
   based on the one or more user queries that were supplemented using machine learning, selecting, by the user interface, a first micro-application of the one or more other micro-applications that corresponds to a first CRM function and a second micro-application of the one or more other micro-applications that corresponds to a second CRM function;
   based on first access restrictions of the first micro-application and second access restrictions of the second micro-application, generating, by the user interface, a first token and a second, different token that each reflect a user of the client computer;
   based on selecting the first micro-application, identifying, by a micro-application domain name service, a first micro-application server that hosts first API functions of the first micro-application and a second micro-application server that hosts first user interface functions of the first micro-application;
   based on selecting the second micro-application, identifying, by the micro-application domain name service, a third micro-application server that hosts second API functions of the second micro-application and a fourth micro-application server that hosts second user interface functions of the second micro-application;
   sending, by the user interface and to the second micro-application server, a first request for the first micro-application that corresponds to the first CRM function and the first token;
   sending, by the user interface and to the fourth micro-application server, a second request for the second micro-application that corresponds to the second CRM function and the second, different token;
   based on a first verification that the first token grants the user of the client device permission to access the first micro-application, receiving, by the user interface from the second micro-application server hosting the first user interface functions of the first micro-application, a first data package that includes the first micro-application corresponding to the first CRM function;
   based on the second verification that the second, different token grants the user of the client device permission to access the second micro-application, receiving, by the user interface from the fourth micro-application server hosting the second user interface functions of the second micro-application, a second data package that includes the second micro-application corresponding to the second CRM function;

injecting, by the container micro-application, the first data package that includes the first micro-application corresponding to the first CRM function in the HTML data object model and the second data package that includes the second micro-application corresponding to the second CRM function in the HTML data object model;

rendering, via the user interface of the container micro-application on a display device communicatively coupled to the client computer, a first interactive area configured to display first information pertaining to the first CRM function by executing, in a first domain, the first micro-application, wherein the container micro-application is configured to store and maintain a first state of the first micro-application;

rendering, via the user interface of the container micro-application on the display device communicatively coupled to the client computer, a second interactive area configured to display second information pertaining to the second CRM function by executing, in a second domain, the second micro-application, wherein the container micro-application is configured to store and maintain a second state of the second micro-application; and removing, by the container micro-application, one or more data packages that include the first and second micro-applications from the HTML data object model.

2. The method of claim 1, wherein the container micro-application is configured to maintain user credentials, user verification status, the first token, the second, different token, and additional tokens.

3. The method of claim 1, wherein:
the first data package is received in real time, in response to sending the first request for the first CRM function, and
the second data package is received in real time, in response to sending the second request for the second CRM function.

4. The method of claim 1, wherein the container micro-application is configured to execute, in parallel, a plurality of micro-applications that includes the first and second micro-applications.

5. The method of claim 1, wherein the container micro-application is configured to cut and paste data between micro-applications that includes the first and second micro-applications.

6. The method of claim 1, wherein the container micro-application is configured to auto-populate data between micro-applications that includes the first and second micro-applications.

7. The method of claim 1, wherein the container micro-application is configured to resolve duplicate data or conflicting data between micro-applications that includes the first and second micro-applications.

8. The method of claim 1, wherein the container micro-application is configured to perform common tasks.

9. A computing device comprising:
one or more processors; and
a memory in communication with the one or more processors, the memory having computer-readable instructions stored thereupon which, when executed by the one or more processors, cause the device to perform operations comprising:
instantiating, on a client computer, a user interface configured with a container micro-application operable to execute one or more other micro-applications, wherein:
the container micro-application implements an execution environment for at least one other micro-application;
the container micro-application is configured to inject and remove any of the one or more other micro-applications from an HTML data object model;
the one or more other micro-applications comprise a code package that implements a CRM function; and
the one or more other micro-applications include an application programming interface (API) configured to receive electronic messages indicative of requests for customer data;
receiving, via the user interface during runtime of the user interface, one or more user queries;
supplementing the one or more user queries using machine learning;
based on the one or more user queries that were supplemented using machine learning, selecting, by the user interface, a first micro-application of the one or more other micro-applications that corresponds to a first CRM function and a second micro-application of the one or more other micro-applications that corresponds to a second CRM function;
based on first access restrictions of the first micro-application and second access restrictions of the second micro-application, generating, by the user interface, a first token and a second, different token that each reflect a user of the client computer;
based on selecting the first micro-application, identifying, by a micro-application domain name service, a first micro-application server that hosts first API functions of the first micro-application and a second micro-application server that hosts first user interface functions of the first micro-application;
based on selecting the second micro-application, identifying, by the micro-application domain name service, a third micro-application server that hosts second API functions of the second micro-application and a fourth micro-application server that hosts second user interface functions of the second micro-application;
sending, by the user interface and to the second micro-application server, a first request for the first micro-application that corresponds to the first CRM function and the first token;
sending, by the user interface and to the fourth micro-application server, a second request for the second micro-application that corresponds to the second CRM function and the second, different token;
based on a first verification that the first token grants the user of the client device permission to access the first micro-application, receiving, by the user interface from the second micro-application server hosting the first user interface functions of the first micro-application, a first data package that includes the first micro-application corresponding to the first CRM function;
based on the second verification that the second, different token grants the user of the client device permission to access the second micro-application, receiving, by the user interface from the fourth micro-application server hosting the second user interface functions of the second micro-application, a second data package that includes the second micro-application corresponding to the second CRM function;

injecting, by the container micro-application, the first data package that includes the first micro-application corresponding to the first CRM function in the HTML data object model and the second data package that includes the second micro-application corresponding to the second CRM function in the HTML data object model;

rendering, via the user interface of the container micro-application on a display device communicatively coupled to the client computer, a first interactive area configured to display first information pertaining to the first CRM function by executing, in a first domain, the first micro-application, wherein the container micro-application is configured to store and maintain a first state of the first micro-application;

rendering, via the user interface of the container micro-application on the display device communicatively coupled to the client computer, a second interactive area configured to display second information pertaining to the second CRM function by executing, in a second domain, the second micro-application, wherein the container micro-application is configured to store and maintain a second state of the second micro-application; and removing, by the container micro-application, one or more data packages that include the first and second micro-applications from the HTML data object model.

10. The device of claim 9, wherein the container micro-application is configured to maintain user credentials, user verification status, the first token, the second, different token, and additional tokens.

11. The device of claim 9, wherein:
the first data package is received in real time, in response to sending the first request for the first CRM function, and
the second data package is received in real time, in response to sending the second request for the second CRM function.

12. The device of claim 9, wherein the container micro-application is configured to execute, in parallel, a plurality of micro-applications that includes the first and second micro-applications.

13. The device of claim 9, wherein the container micro-application is configured to cut and paste data between micro-applications that includes the first and second micro-applications.

14. The device of claim 9, wherein the container micro-application is configured to auto-populate data between micro-applications that includes the first and second micro-applications.

15. The device of claim 9, wherein the container micro-application is configured to resolve duplicate data or conflicting data between micro-applications that includes the first and second micro-applications.

16. The device of claim 9, wherein the container micro-application is configured to perform common tasks.

17. A non-transitory computer-readable medium including computer-executable instructions that, if executed by a computing device, cause the computing device to perform operations comprising:

instantiating, on a client computer, a user interface configured with a container micro-application operable to execute one or more other micro-applications, wherein:
the container micro-application implements an execution environment for at least one other micro-application;
the container micro-application is configured to inject and remove any of the one or more other micro-applications from an HTML data object model;
the one or more other micro-applications comprise a code package that implements a CRM function; and
the one or more other micro-applications include an application programming interface (API) configured to receive electronic messages indicative of requests for customer data;

receiving, via the user interface during runtime of the user interface, one or more user queries;

supplementing the one or more user queries using machine learning;

based on the one or more user queries that were supplemented using machine learning, selecting, by the user interface, a first micro-application of the one or more other micro-applications that corresponds to a first CRM function and a second micro-application of the one or more other micro-applications that corresponds to a second CRM function;

based on first access restrictions of the first micro-application and second access restrictions of the second micro-application, generating, by the user interface, a first token and a second, different token that each reflect a user of the client computer;

based on selecting the first micro-application, identifying, by a micro-application domain name service, a first micro-application server that hosts first API functions of the first micro-application and a second micro-application server that hosts first user interface functions of the first micro-application;

based on selecting the second micro-application, identifying, by the micro-application domain name service, a third micro-application server that hosts second API functions of the second micro-application and a fourth micro-application server that hosts second user interface functions of the second micro-application;

sending, by the user interface and to the second micro-application server, a first request for the first micro-application that corresponds to the first CRM function and the first token;

sending, by the user interface and to the fourth micro-application server, a second request for the second micro-application that corresponds to the second CRM function and the second, different token;

based on a first verification that the first token grants the user of the client device permission to access the first micro-application, receiving, by the user interface from the second micro-application server hosting the first user interface functions of the first micro-application, a first data package that includes the first micro-application corresponding to the first CRM function;

based on the second verification that the second, different token grants the user of the client device permission to access the second micro-application, receiving, by the user interface from the fourth micro-application server hosting the second user interface functions of the second micro-application, a second data package that includes the second micro-application corresponding to the second CRM function;

injecting, by the container micro-application, the first data package that includes the first micro-application corresponding to the first CRM function in the HTML data object model and the second data package that includes the second micro-application corresponding to the second CRM function in the HTML data object model;

rendering, via the user interface of the container micro-application on a display device communicatively coupled to the client computer, a first interactive area configured to display first information pertaining to the first CRM function by executing, in a first domain, the first micro-application, wherein the container micro-application is configured to store and maintain a first state of the first micro-application;

rendering, via the user interface of the container micro-application on the display device communicatively coupled to the client computer, a second interactive area configured to display second information pertaining to the second CRM function by executing, in a second domain, the second micro-application, wherein the container micro-application is configured to store and maintain a second state of the second micro-application; and removing, by the container micro-application, one or more data packages that include the first and second micro-applications from the HTML data object model.

18. The medium of claim 17, wherein the container micro-application is configured to maintain user credentials, user verification status, the first token, the second, different token, and additional tokens.

19. The medium of claim 17, wherein:
the first data package is received in real time, in response to sending the first request for the first CRM function, and
the second data package is received in real time, in response to sending the second request for the second CRM function.

20. The medium of claim 17, wherein the container micro-application is configured to execute, in parallel, a plurality of micro-applications that includes the first and second micro-applications.

\* \* \* \* \*